UNITED STATES PATENT OFFICE.

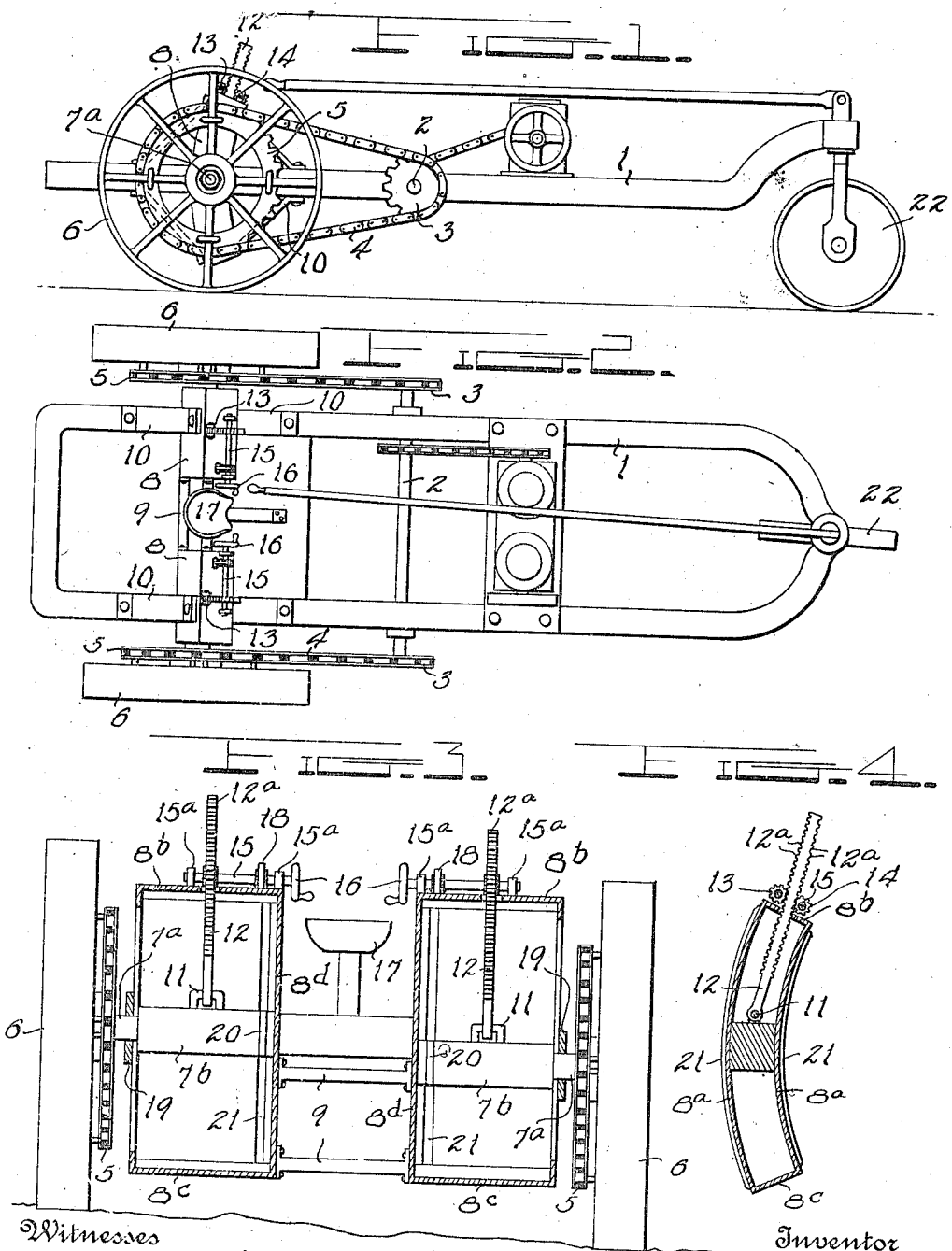

EDWARD EARL HOWELL, OF MILLBROOK, NEW YORK.

TRACTOR.

1,175,451.                   Specification of Letters Patent.    Patented Mar. 14, 1916.

Application filed April 16, 1915. Serial No. 21,648.

*To all whom it may concern:*

Be it known that I, EDWARD E. HOWELL, a citizen of the United States, residing at Millbrook, in the county of Dutchess and State of New York, have invented certain new and useful Improvements in Tractors, of which the following is a specification.

The present invention relates to a rear axle mounting for tractors and like machines, and has for its object to provide a device of this character which embodies novel features of construction whereby the drive wheels upon opposite sides of the machine can be readily set at different elevations so as to admit of the tractor being readily used upon the side of a hill.

Further objects of the invention are to provide a device of this character which is comparatively simple and inexpensive in its construction, which admits of the axles upon which the wheels are journaled being raised or lowered by the operator without moving from his seat, which always maintains the proper tension in the drive chains, regardless of the elevation of the axle sections, and which is strong and durable in its construction and not liable to get out of repair.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which:—

Figure 1 is a side elevation of a tractor embodying a rear axle mounting constructed in accordance with the invention. Fig. 2 is a top plan view thereof. Fig. 3 is a vertical longitudinal sectional view through the segmental guides, showing the axle sections arranged at different elevations to compensate for the incline of the surface upon which the tractor rests. Fig. 4 is a transverse sectional view through one of the segmental guides.

Corresponding and like parts are referred to in the following description and indicated in all the views of the drawings by the same reference characters.

Specifically describing the present embodiment of the invention, the numeral 1 designates the main frame of the tractor, and 2 a transverse drive shaft which is journaled upon the main frame at an intermediate point in the length thereof. Power may be applied to this drive shaft 2 from any suitable form of engine mounted upon the frame. Opposite ends of the transverse drive shaft 2 have sprocket wheels 3 rigidly applied thereto, said sprocket wheels engaging drive chains 4 which also pass around sprocket wheels 5 applied to the drive or traction wheels 6 of the tractor.

The traction wheels 6 are journaled upon the outer ends $7^a$ of axle sections which are mounted so as to be bodily raised and lowered independently of each other, thereby admitting of the traction wheels 6 on opposite sides of the frame being set at different elevations so that the tractors can be used effectively upon the side of a hill. The outer ends $7^a$ of the axle sections upon which the wheels 6 are journaled have a circular cross section, while the inner ends $7^b$ are rectangular or square in cross section and are slidably mounted within the curved or segmental guides 8 which project both above and below the main frame 1, the curvature of the guides having the axis of the transverse drive shaft 2 as a center so that the tension in the sprocket chains 4 will remain the same as the axles are adjusted, being neither increased nor decreased.

The segmental guides 8 extend transversely of the machine and are arranged in alinement with each other, each of the guides including spaced plates $8^a$ which have a width substantially equal to the length of the square ends $7^b$ of the axles and are connected by a top plate $8^b$ and a bottom plate $8^c$. The inner ends of the segmental guideways 8 may be closed by the plates $8^d$, said plates being connected by the brace members 9 so as to obtain a rigid construction. The side bars of the frame 1 are broken away to receive the segmental guideways 8 and the upwardly and downwardly projecting portions of the guideways 8 are connected to the frame 1 by diagonal braces 10 so as to obtain a strong and rigid construction.

Loosely connected at 11 to the square portions $7^b$ of each of the shaft sections is an adjusting rod which extends upwardly through the top plate $8^b$ of the guideway. Racks $12^a$ are provided upon opposite sides of the adjusting rod 12 and these racks mesh with pinions 13 and 14 mounted upon the top of the guideway 8. One of these pinions, in the present instance the pinion 14 is rigid with a transverse shaft 15 which is journaled within suitable bearings 15$^a$ and is provided at its inner end with a hand wheel 16. The two hand wheels 16 are located upon opposite sides of the operator's seat 17 so that they can be manipulated by him without difficulty. Any conventional form of latch means, such as that indicated at 18, may be provided for normally locking the shafts 15 against rotation so that the axles will be held in an adjusted position.

The axle sections are intended to maintain a horizontal position as they are raised and lowered, and in order to prevent any possibility of the axle sections tilting from side to side, some suitable form of guide means may be employed. In the present instance guide plates 19 are rigidly applied to the axle sections at the junction of the round outer ends 7$^a$ and square inner ends 7$^b$ thereof, the said guide plates sliding against and obtaining a bearing upon the outer edges of the guideways 8. The inner ends of the axle sections may be formed upon the sides thereof with vertical ribs 20 adapted to travel within guide grooves 21 formed in the side plates 8$^a$ of the guideways 8. In this manner the axle sections are prevented from tilting out of a horizontal position as they are raised and lowered.

The forward end of the tractor frame 1 may be supported in any suitable manner, as by means of a guide wheel 22, and the entire machine is controlled by an operator from the seat 17. By releasing the latch means 18 and suitably manipulating the hand wheels 16 the two axle sections can be raised and lowered independently of each other and set either at different elevations or at the same elevation, as may be desired. The curvature of the guideways 8 has the axis of the transverse drive shaft 2 as a center so that the sprocket chains 4 remain under the same tension as the axle sections are adjusted vertically.

Having thus described the invention, what I claim as new and desire to secure by Letters Patent, is:—

1. An axle mounting for tractors and the like, including upright guideways applied to opposite sides of the main frame, horizontal axle sections provided with rectangular inner ends which are slidably received within the guideways and cylindrical outer ends projecting beyond the guideways, wheels journaled upon the said cylindrical outer ends, means for raising and lowering the axle sections within the guideways, and means for preventing tilting of the axle sections within the guideways.

2. An axle mounting for tractors and the like, including a main frame, corresponding and upright guideways applied to opposite sides thereof, independent horizontal axle sections formed with rectangular inner ends which are slidably mounted within the upright guideways and cylindrical outer ends which project beyond the guideways, wheels journaled upon the cylindrical outer ends of the guideways, rack bars loosely connected to the axle sections and extending upwardly through the guideways, pinions meshing with the rack bars, means for operating the pinions to adjust the axle sections independently of each other, and means for maintaining the axle sections in a horizontal position as they are raised and lowered.

3. An axle mounting for tractors and the like, including a main frame, upright guideways applied to opposite sides of the main frame, said guideways being formed with transversely spaced side plates which are disposed with respect to the machine and are provided toward the inner ends thereof with vertically extending grooves, independent axle sections formed with rectangular inner ends which are slidably received within the guideways and cylindrical ends projecting beyond the guideways, wheels journaled upon the said cylindrical ends of the axle sections, guide plates applied to the axle sections and slidably engaging the outer ends of the guideways, ribs upon the inner ends of the axle sections which travel in the before mentioned grooves of the plates of the guideways, and means for independently adjusting the axle sections within the guideways, said axle sections maintaining a horizontal position at all times.

4. An axle mounting for tractors and the like, including a main frame, upright guideways applied to opposite sides of the main frame and formed with spaced side plates which extend transversely of the machine and have vertically extending grooves at the inner ends thereof, independent axle sections formed with rectangular inner ends which are slidably received within the guideways and cylindrical outer ends which project from the guideways, wheels journaled upon the cylindrical outer ends of the axle sections, a guide plate applied to each axle section and slidably engaging the outer end of the guideway, guide ribs projecting from the inner ends of the axle sections and loosely received within the before mentioned grooves of the side plates of the guideways, a rack bar connected to each axle section and extending through the guideway, pinions meshing with the rack bars, and independent means for rotating the pinions to adjust the axle sections independently of each other, said axle sections maintaining a substantially horizontal position at all times.

5. An axle mounting for tractors and the like, including a main frame, corresponding upright guideways applied to opposite sides of the main frame, brace members connecting the corresponding guideways, brace members connecting the ends of the corresponding guideways to the main frame, independent axle sections slidably mounted within the guideways, wheels journaled upon the axle sections, and means for adjusting the axle sections independently of each other.

In testimony whereof I affix my signature in presence of two witnesses.

EDWARD EARL HOWELL.

Witnesses:
  RAY C. ROGERS,
  H. G. BRIGGS.